Feb. 3, 1953

R. C. PAINE 2,627,546

PULSE WIDTH MEASUREMENT

Filed Nov. 15, 1949

ROBERT C. PAINE
INVENTOR.

BY John J. Rogan
ATTORNEY

Patented Feb. 3, 1953

2,627,546

UNITED STATES PATENT OFFICE 2,627,546

PULSE WIDTH MEASUREMENT

Robert C. Paine, Boonton, N. J., assignor to Measurements Corporation, Boonton, N. J., a corporation of New Jersey Application November 15, 1949, Serial No. 127,339

7 Claims. (Cl. 175—381)

This invention relates to pulse width measurement, and more particularly it relates to the measurement of steep-sided electric pulses such as are used in various forms of electric signalling systems.

A principal object of the invention is to provide a more accurate and simplified method and apparatus for measuring the time width of pulses having steep leading and trailing edges.

A feature of the invention relates to apparatus for measuring or determining pulse width by employing a tuned coupling network between the source of the pulses and an oscillation detector or indicator, and by correlating the periodicity of the tuned network with the pulse width to produce a special wave indication on a wave detector or indicator, which identifies the pulse width.

Another feature relates to the combination of a source of pulses whose pulse width is to be determined, a wave indicator such for example as an oscilloscope, and a tuned network of known periodicity which loosely couples the said source to the indicator, and which is set into oscillation by the leading edge of the pulse to be measured. Either the said source is adjustable to vary the pulse width, or the tuned circuit is adjustable to vary its periodicity until a predetermined correlation exists between the leading and trailing edges of each pulse with respect to the duration of each oscillation from the tuned circuit.

Another feature relates to a pulse width measuring system employing standard apparatus such as a cathode-ray tube oscilloscope and a tunable coupling circuit.

A still further feature relates to the novel organization, arrangement and relative location and interconnection of parts which cooperate to provide a simplified pulse width measuring arrangement.

Other features and advantages not specifically enumerated will become apparent after a consideration of the following detailed description and the appended claims.

Figure 1:
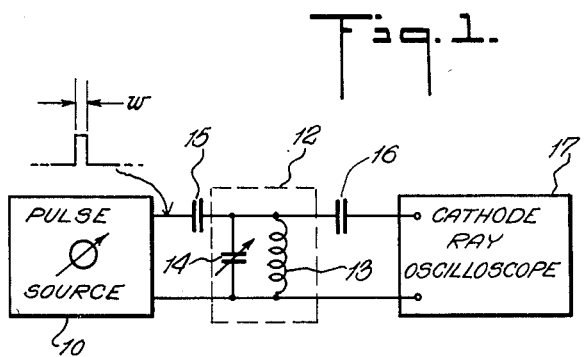

In the drawing which shows, by way of example, one preferred manner of practicing the invention, Fig. 1 is a simplified schematic diagram of a pulse width measuring arrangement according to the invention.

Figure 2A:
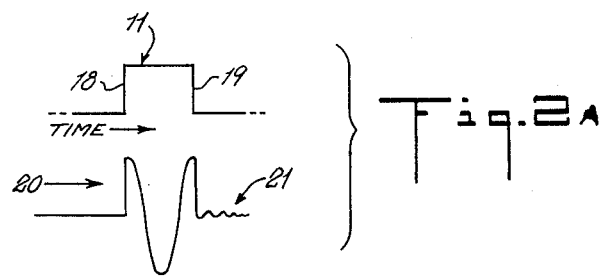
Figure 2B:
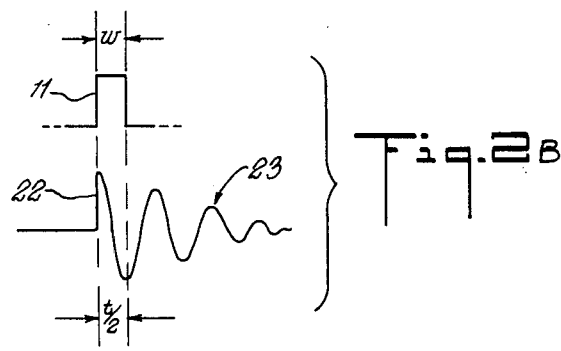

Figs. 2A and 2B are respective wave diagrams explanatory of the operation of Fig. 1.

In many kinds of communication and electric signalling systems, it is the practice to use pulses or steep-sided waves to convey the intelligence signals. Usually these pulses are of the order of micro-seconds in pulse width and relatively expensive and complex equipment has been required heretofore, in order to determine the pulse width with the desired degree of accuracy. The present invention provides for a high degree of accuracy in the pulse width measurement, and the measurement can be made by means of conventional equipment which is available in any reasonably well equipped laboratory.

Referring to Fig. 1 of the drawing, the block 10 represents schematically any well-known source of steep-sided pulses whose pulse width "$w$" is to be determined. In many cases, the source 10 may have means for varying the width of the generated pulses. In other cases, as for example in the monitoring of pulses in a communication channel, the pulse may be either of a fixed width as in the case of pulse-position modulation, or the pulse width may vary as in so-called pulse-width modulation. In either case it may be desirable to measure with the desired accuracy, the actual width "$w$" in micro-seconds.

For that purpose, the pulse source 10 is in accordance with the invention, coupled through a tunable oscillatory network 12, comprising for example an inductance 13 and an adjustable tuning condenser. It will be understood of course, that if desired the inductance 13 may be of the adjustable type. Furthermore, the network 12 may be of any well-known type and may even be a tunable wave transmission line, tunable cavity resonator or the like. The network input is loosely coupled to the source 10 in any well-known manner, for example by a small capacitance 15. Likewise, the network output is loosely coupled, as for example by a small capacitance 16, to any well-known instrument 17 which produces visual indications of the electrical oscillations impressed thereon. Preferably, although not necessarily, the device 17 is a cathode-ray tube oscilloscope wherein a suitable time base signal is applied to one of the coordinate beam deflecting elements such as the usual horizontal deflector plates; and wherein the output of the network 12 is applied to the other coordinate beam deflecting elements, for example the usual vertical beam deflecting plates. It will be understood that the coupling elements 15 and 16 may be replaced by any other suitable coupling means which respectively load the source 10 and the tuned circuit 12 very lightly.

As shown in Fig. 2A, the pulse 11 has a leading edge 18 which represents in effect a very abrupt change in voltage from zero to the maximum of the pulse top. Consequently, this leading edge 18 of the pulse excites tuned circuit 12 and sets it into oscillation in the well-known manner. On the other hand, the trailing edge 19 of this same pulse, arriving at the tuned circuit at a later time, also consists of an abrupt change in voltage but in the reverse sense, that is a falling voltage. The effect of this abrupt falling voltage on a single oscillation in the tuned circuit 12 is represented by the graph 20. From Fig. 2A, it will be seen that when the trailing edge 19 of the pulse arrives at the tuned circuit just as the initial full cycle of oscillation of the tuned circuit is being completed, the falling voltage characteristic of the edge 19, tends to abstract the energy from the tuned circuit and to stop its oscillation or at least to cause the oscillations to be reduced to a negligibly low amplitude. This is indicated as a displayed figure of minimum amplitude on the screen of the oscilloscope 17.

On the other hand, when there is timed coincidence between the arrival of the trailing edge 19 of the pulse and the beginning of each half cycle, or subsequent odd numbered half cycle, of oscillation of the tuned circuit, the trailing edge 19, instead of abstracting energy from the oscillatory circuit, tends to maintain it in oscillation. Thus, as shown in Fig. 2B, and considering a single oscillatory wave, if the periodicity of the network 12 is adjusted so that the half wave time $t/2$ is equal to the width "$w$" of the pulse 11, the circuit 12 will be maintained in oscillation and considering successive oscillatory periods, the oscillations will be further increased in amplitude. Thus, this condition will be represented on the cathode-ray tube oscilloscope 17 in the form of a display figure which has a maximum amplitude. On the other hand, when the tuned circuit 12 is adjusted so that the trailing edge 19 is in timed coincidence with the completion of each full wave period, the figure that is displayed upon the cathode-ray tube screen will be at a minimum amplitude. In the measurement of pulses, it is desirable that the pulse width should correspond to one or more complete oscillation cycles, since this correlation on the oscilloscope screen has a sharp null or minimum. While therefore, the preferred arrangement comprises producing timed coincidence between the trailing edge of the pulse and the termination of each complete cycle of oscillation of the tuned circuit, it will be understood that the alternative arrangement wherein the trailing edge of the pulse is in timed coincidence with the completion of each half wave of oscillation of the tuned circuit, can be used according to the invention. However, the latter indication as produced on the cathode-ray tube oscilloscope screen is broader and less accurate or less well defined than in the former indication. Since the circuit 12 can have its periodicity controlled by the condenser 14 or the inductance 13, the adjusting element of the condenser 14 or the adjusting element of the inductance 13, can be calibrated directly in terms of pulse width.

Instead of varying the frequency of the tuned circuit 12, the pulse width 11 may be varied so as to bring about the above-mentioned timed correlation between the pulse width and the periodicity of the tuned natural frequency of the circuit 12. For example, if the tuned circuit 12 is of known periodicity and is fixed, and if the pulse width 11 is gradually increased from zero, the amplitude of the oscillations 22 in Fig. 2A, will produce a maximum amplitude figure on the oscilloscope screen at which setting the pulse width "$w$" equals one-half the cyclical frequency of the tuned circuit 12. Any further increase in the pulse width "$w$" causes the oscillations of the tuned circuit to die out abruptly or to decrease to a null or minimum from which it can be determined that the pulse width "$w$" is equal in time to that of one complete cycle of oscillation of the tuned circuit 12. Likewise, successive maximums and minimums of the oscillations from the tuned circuit follow each other at half-cycle intervals for pulse widths corresponding to one and one-half cycles, two cycles, etc., where the cycles are referred to the natural tuned frequency of the circuit 12. It will be understood of course, that any other form of indicator may be used to determine when the pulse time width is equal to the full period or to one-half period of the natural frequency of the circuit 12. By the term "pulse," as employed herein, is meant a wave in which the displacement at each point of the medium is an aperiodic function of the time so as to produce at any point a single displacement subsequent to which the medium returns to a state of passive equilibrium, as set forth in the "American Standard Definitions and Electrical Terms."

Various changes and modifications may be made in the invention as disclosed herein without departing from its spirit and scope.

What is claimed is:

1. Apparatus for determining the width of a steep-sided electric pulse, consisting of a tuned oscillatory circuit having a relatively protracted wave damping characteristic, a wave indicator, a source of square-wave pulses, means coupling the said source to the input of said circuit to set said circuit in oscillation at its natural frequency, means coupling said indicator to the output of said circuit, both of said coupling means exerting substantially negligible detuning action on said tuned circuit, and means to match the pulse width with the length of a single period of the tuned circuit to sharply damp the oscillations in said tuned circuit at the instant of occurrence of the trailing edge of said pulse and thereby to produce a characteristic indication on said indicator indicative of the pulse width.

2. Apparatus according to claim 1, in which said tuned oscillatory circuit is coupled to the source of pulses through a coupling reactance of minute loading value and said oscillatory circuit is coupled to said indicator through another coupling reactance of minute loading value.

3. Apparatus for determining the width of a steep-sided electric pulse, consisting of a tuned oscillatory circuit having a relatively protracted wave damping characteristic, a wave indicator, a source of square-wave pulses, means coupling the said source to the input of said circuit to set said circuit in oscillation at its natural frequency, means coupling said indicator to the output of said circuit, both of said coupling means exerting substantially negligible detuning action on said tuned circuit, and means to match the pulse width with the natural frequency of said circuit until it is equal to the duration of one half cycle of oscillation of the tuned circuit to sharply damp the oscillations of said tuned circuit at the instant of occurrence of the trailing edge of said pulse and thereby to produce a characteristic indication on said indicator representing the pulse width.

4. Apparatus for determining the width of a steep-sided electric pulse, comprising a tuned oscillatory circuit having a relatively protracted wave damping characteristic, a wave indicator for indicating the oscillations of said circuit, a source of square-wave pulses, means coupling said source to the input of said circuit to cause the leading edge of the pulse to set said circuit in oscillation at its natural frequency but without exerting any substantial detuning of said tuned circuit, means coupling said wave indicator to the output of said circuit, both of said coupling means exerting substantially negligible detuning action on said tuned circuit, and means to adjust the pulse width to control the time of arrival of the trailing edge of the pulse at said circuit until it is substantially coincident with the completion of a single full cycle of oscillation of the said natural frequency, and thereby to produce sharp damping of the oscillations of said tuned circuit at the instant corresponding to said trailing edge.

5. Apparatus for determining the width of a steep-sided electric pulse, comprising a tuned oscillatory circuit having a relatively protracted wave damping characteristic, a cathode-ray tube oscilloscope for producing an indication of the oscillations of said circuit, means to apply to the input of said circuit the pulse whose width is to be determined, means coupling said oscilloscope to the output of said circuit, and means to bring the trailing edge of the pulse into timed coincidence with the termination of each pulse oscillation period of said circuit, and thereby to produce sharp damping of the oscillations of said tuned circuit at the instant corresponding to said trailing edge.

6. Apparatus according to claim 5, in which the last-mentioned means includes a device for adjusting the natural frequency of said tuned circuit.

7. Apparatus according to claim 5, in which the last-mentioned means includes a device for adjusting the width of the pulse to be determined.

ROBERT C. PAINE.

REFERENCES CITED

The following references are of record in the file of this patent:

UNITED STATES PATENTS

| Number | Name | Date |
|---|---|---|
| 2,412,963 | Chatterjea et al. | Dec. 24, 1946 |
| 2,574,470 | Finney | Nov. 13, 1951 |

OTHER REFERENCES

Electronics for Sept. 1944, article entitled Impedance Measurements with Square Waves, by Rockett, pages 138 to 140 and 336 to 338.

Publication, Oscillographer for Mar.–April 1945, article entitled Cathode-Ray Q-Meter, pages 1 to 4.